US010279309B2

(12) United States Patent
Ingram et al.

(10) Patent No.: US 10,279,309 B2
(45) Date of Patent: *May 7, 2019

(54) REMOVAL OF CARBON DIOXIDE FROM A FLUID FLOW

(71) Applicant: BASF SE, Ludwigshafen (DE)

(72) Inventors: Thomas Ingram, Mannheim (DE); Ralf Notz, Ludwigshafen (DE); Gerald Vorberg, Speyer (DE); Georg Sieder, Bad Duerkheim (DE); Gustavo Adolfo Lozano Martinez, Ludwigshafen (DE); Hugo Rafael Garcia Andarcia, Shanghai (CN)

(73) Assignee: BASF SE, Ludwigshafen (DE)

( * ) Notice: Subject to any disclaimer, the term of this patent is extended or adjusted under 35 U.S.C. 154(b) by 43 days.

This patent is subject to a terminal disclaimer.

(21) Appl. No.: 15/506,646

(22) PCT Filed: Aug. 20, 2015

(86) PCT No.: PCT/EP2015/069160
§ 371 (c)(1),
(2) Date: Feb. 24, 2017

(87) PCT Pub. No.: WO2016/030276
PCT Pub. Date: Mar. 3, 2016

(65) Prior Publication Data
US 2017/0282116 A1 Oct. 5, 2017

(30) Foreign Application Priority Data

Aug. 25, 2014 (EP) .................................. 14182105

(51) Int. Cl.
| C07C 217/08 | (2006.01) |
| C07C 217/28 | (2006.01) |
| C07C 217/42 | (2006.01) |
| B01D 53/14 | (2006.01) |
| B01D 53/62 | (2006.01) |
| B01D 53/78 | (2006.01) |
| B01D 53/96 | (2006.01) |

(Continued)

(52) U.S. Cl.
CPC ..... *B01D 53/1493* (2013.01); *B01D 53/1425* (2013.01); *B01D 53/1475* (2013.01);
(Continued)

(58) Field of Classification Search
None
See application file for complete search history.

(56) References Cited

U.S. PATENT DOCUMENTS

| 4,101,633 A | 7/1978 | Sartori et al. |
| 4,471,138 A | 9/1984 | Stogryn |

(Continued)

FOREIGN PATENT DOCUMENTS

| CA | 1290553 | 10/1991 |
| CA | 1295810 | 2/1992 |

(Continued)

OTHER PUBLICATIONS

International Search Report dated Apr. 6, 2016 in PCT/EP2015/069160.

*Primary Examiner* — Daniel Berns
(74) *Attorney, Agent, or Firm* — Oblon, McClelland, Maier & Neustadt, L.L.P.

(57) ABSTRACT

An absorbent for removing carbon dioxide from a fluid stream, comprising an aqueous solution a) of an amine of the general formula (I)

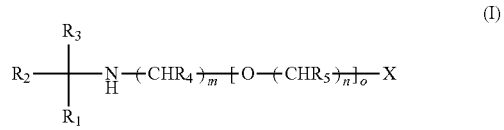

in which $R_1$, $R_2$ and $R_3$ are each independently selected from $C_{1-4}$-alkyl and $C_{1-4}$-hydroxyalkyl; each $R_4$ is independently selected from hydrogen, $C_{1-4}$-alkyl and $C_{1-4}$-hydroxyalkyl; each $R_5$ is independently selected from hydrogen, $C_{1-4}$-alkyl and $C_{1-4}$-hydroxyalkyl; X is OH or $NH(CR_1R_2R_3)$; m is 2, 3, 4 or 5; n is 2, 3, 4 or 5; and o is 0 or 1; and b) at least one activator selected from b1) a sterically unhindered primary amine and/or a sterically unhindered secondary amine; and a carboanhydrase. The absorbent allows rapid absorption of carbon dioxide from fluid streams.

14 Claims, 3 Drawing Sheets

(51) Int. Cl.
*C10L 3/10* (2006.01)
*C10L 3/12* (2006.01)

(52) U.S. Cl.
CPC .............. *C10L 3/104* (2013.01); *C10L 3/12* (2013.01); *B01D 2252/2026* (2013.01); *B01D 2252/2041* (2013.01); *B01D 2252/20426* (2013.01); *B01D 2252/20447* (2013.01); *B01D 2252/20484* (2013.01); *B01D 2252/502* (2013.01); *B01D 2252/504* (2013.01); *B01D 2252/602* (2013.01); *B01D 2258/0283* (2013.01); *C10L 2290/541* (2013.01); *Y02A 50/2342* (2018.01); *Y02C 10/06* (2013.01)

(56) References Cited

U.S. PATENT DOCUMENTS

| | | | |
|---|---|---|---|
| 4,537,753 | A | 8/1985 | Wagner et al. |
| 4,553,984 | A | 11/1985 | Volkamer et al. |
| 4,997,630 | A | 3/1991 | Wagner et al. |
| 4,999,031 | A | 3/1991 | Gerhardt et al. |
| 6,036,931 | A | 3/2000 | Yoshida et al. |
| 6,436,174 | B1 | 8/2002 | Grossmann et al. |
| 8,192,531 | B2 | 6/2012 | Fradette et al. |
| 2009/0199713 | A1 | 8/2009 | Asprion et al. |
| 2010/0288125 | A1 | 11/2010 | Vorberg et al. |
| 2013/0243676 | A1 | 9/2013 | Siskin et al. |

FOREIGN PATENT DOCUMENTS

| | | |
|---|---|---|
| EP | 0 159 495 A2 | 10/1985 |
| EP | 0 190 434 A2 | 8/1986 |
| EP | 0 202 600 A2 | 11/1986 |
| EP | 0 359 991 A1 | 3/1990 |
| EP | 0 558 019 A2 | 9/1993 |
| WO | WO 00/00271 A1 | 1/2000 |
| WO | WO 2006/089423 A1 | 8/2006 |
| WO | WO 2007/134994 A2 | 11/2007 |

REMOVAL OF CARBON DIOXIDE FROM A FLUID FLOW

This application is a National Stage of PCT/EP2015/069160, which was filed on Aug. 20, 2015. This application is based upon and claims the benefit of priority to European Application No. 14182105.8, which was filed on Aug. 25, 2014.

The present invention relates to an absorbent and to processes for removing carbon dioxide from a fluid stream.

The removal of acid gases, for example $CO_2$, $H_2S$, $SO_2$, $CS_2$, HCN, COS or mercaptans, from fluid streams such as natural gas, refinery gas or synthesis gas is important for various reasons. $CO_2$ in conjunction with water, which is frequently entrained in the fluid streams, can form acids, which lead to corrosion in pipes and valves. Carbon dioxide has to be removed from natural gas among other substances to such an extent that the calorific value of the gas does not fall below the desired value. For further processing in a natural gas liquefaction plant (LNG=liquefied natural gas), $CO_2$, in contrast, has to be removed completely.

Acid gases are removed by using scrubbing operations with aqueous solutions of inorganic or organic bases. When acid gases are dissolved in the absorbent, ions form with the bases. The absorbent can be regenerated by decompression to a lower pressure and/or by stripping, in which case the ionic species react in reverse to form acid gases and/or are stripped out by means of steam. After the regeneration process, the absorbent can be reused.

High $CO_2$ absorption rates and/or effective $CO_2$ removal, even at low partial $CO_2$ pressures, are possible through the use of absorbents having a high $CO_2$ affinity, such as primary and secondary alkanolamines. High $CO_2$ affinity requires that the $CO_2$ absorption proceeds with high exothermicity. However, absorbents of this kind, because of the high magnitude of the absorption reaction enthalpy, generally also entail a relatively high energy consumption in the regeneration.

In contrast to primary and secondary alkanolamines, tertiary alkanolamines, for example methyldiethanolamine (MDEA), do not react directly with carbon dioxide, since the amine is fully substituted. Instead, carbon dioxide is reacted with the tertiary alkanolamine and with water to give hydrogencarbonate in a reaction with a lower reaction rate. Conversion of one $CO_2$ molecule requires one amine molecule. Since no direct bond forms between tertiary alkanolamines and carbon dioxide, the amine solution can be regenerated in a very economically viable manner. In many cases, a flash regeneration with one or more decompression stages is sufficient. An optional additional thermal regeneration requires significantly less energy than in the case of solutions of primary or secondary alkanolamines.

Sterically unhindered primary or secondary amines, for example piperazine, can accelerate the $CO_2$ absorption of tertiary amines as promoters through intermediate formation of a carbamate structure. In this direct reaction of the amine with carbon dioxide, the absorption rate is high, but on the other hand only one $CO_2$ molecule can be absorbed by two amine molecules. For instance, U.S. Pat. No. 4,336,233 discloses a process for removing $CO_2$ and/or $H_2S$ from gases by means of an aqueous absorbent comprising MDEA and piperazine. The use of piperazine as $CO_2$ promoter enables a $CO_2$ absorption rate many times higher compared to systems without a promoter.

EP 0 558 019 discloses a process for removing carbon dioxide from combustion offgases. An absorbent is used which combines 100 parts by weight of a first compound selected from 2-amino-2-methyl-1,3-propanediol, 2-amino-2-methyl-1-propanol, 2-amino-2-ethyl-1,3-propanediol, t-butyldiethanolamine and 2-amino-2-hydroxymethyl-1,3-propanediol, with 1-25 parts by weight of a second compound selected from piperazine, piperidine, morpholine, glycine, 2-methylaminoethanol, 2-piperidineethanol and 2-ethylaminoethanol. The use of the second compound enables a high $CO_2$ absorption rate compared to systems lacking such a second compound.

U.S. Pat. No. 6,036,931 describes a process for removing carbon dioxide from offgases by means of an aqueous absorption solution. The absorbent comprises 100 parts of an amine with a hydroxyl group and a primary amino group, the primary amino group being bonded to a tertiary carbon atom having two substituted alkyl groups; and 1 to 25 parts of an amine selected from piperidine, morpholine, glycine and an alkanolamine with a secondary amino group, the secondary amino group bearing an unsubstituted alkyl group having 1 to 3 carbon atoms and the nitrogen atom being bonded to a group comprising a chain of 2 or more carbon atoms.

U.S. Pat. No. 4,101,633 likewise discloses a process for removing carbon dioxide from gas mixtures. An absorbent comprising at least 50% of a sterically hindered alkanolamine, such as 2-(2-amino-2-methylpropoxy)ethanol, and at least 10% of a tertiary amino alcohol is used.

WO 2006/089423 A1 discloses absorbents comprising an amine selected from tertiary amines, secondary alkanolamines, 2-(2-aminoethylamino)ethanol, 2-amino-2-methyl-1-propanol, alkyleneamines, alkyl ethers of alkylene glycols, dimethyl ether of polyethylene glycol, tetraethylene glycol dimethyl ether, amino ethers, 2-substituted piperidine alcohols, piperazine, piperazine derivatives, carboxylates and combinations thereof, and carboanhydrases. It was shown that the addition of carboanhydrases leads to improved $CO_2$ absorption.

U.S. Pat. No. 8,192,531 B2 discloses absorbents comprising a compound selected from amines, alkanolamines, dialkyl ethers of polyalkylene glycols and mixtures thereof, and carboanhydrase as activator. Here too, it was shown that the addition of carboanhydrases leads to improved $CO_2$ absorption.

U.S. Pat. No. 4,471,138 showed that highly sterically hindered secondary amines such as 2-(2-tert-butylaminoethoxy)ethanol (TBAEE), even in combination with further amines such as methyldiethanolamine (MDEA), have a much higher $H_2S$ selectivity than MDEA. Amines which are referred to as highly sterically hindered are those wherein the nitrogen atom therein is bonded to one or more extensive groups and which have a cumulative steric parameter (Taft constant) $E_s$ of more than 1.75.

It is an object of the invention to specify an absorbent and a process which allows rapid absorption of carbon dioxide from fluid streams, without any significant increase in the required regeneration energy compared to absorbents based on tertiary amines. A higher $CO_2$ absorption rate leads to a shorter contact time between absorbent and fluid stream. One effect of this is that the absorber can be designed with a shorter length or lower absorbent circulation rates can be chosen.

It has now been found that, surprisingly, the $CO_2$ absorption rate of an aqueous solution of an amine of the formula (I) and an activator is much higher than that of a tertiary amine and of an activator.

The object is achieved by an absorbent for removal of carbon dioxide from a fluid stream, comprising an aqueous solution comprising:

a) an amine of the general formula (I)

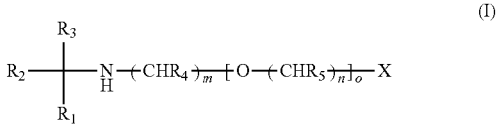

in which $R_1$, $R_2$ and $R_3$ are each independently selected from $C_{1-4}$-alkyl and $C_{1-4}$-hydroxyalkyl; each $R_4$ is independently selected from hydrogen, $C_{1-4}$-alkyl and $C_{1-4}$-hydroxyalkyl; each $R_5$ is independently selected from hydrogen, $C_{1-4}$-alkyl and $C_{1-4}$-hydroxyalkyl; X is OH or $NH(CR_1R_2R_3)$; m is 2, 3, 4 or 5; n is 2, 3, 4 or 5; and o is 0 or 1;

and b) at least one activator selected from b1) a sterically unhindered primary amine and/or a sterically unhindered secondary amine;

and b2) a carboanhydrase.

The invention also relates to a process for removing carbon dioxide from a fluid stream, in which the fluid stream is contacted with the inventive absorbent.

The absorbent comprises an aqueous solution of an alkanolamine of the general formula (I)

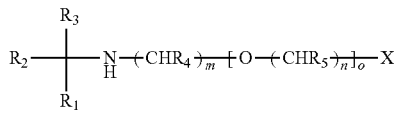

(I)

in which $R_1$, $R_2$ and $R_3$ are each independently selected from $C_{1-4}$-alkyl and $C_{1-4}$-hydroxyalkyl; each $R_4$ is independently selected from hydrogen, $C_{1-4}$alkyl and $C_{1-4}$-hydroxyalkyl; each $R_5$ is independently selected from hydrogen, $C_{1-4}$-alkyl and $C_{1-4}$-hydroxyalkyl; X is OH or $NH(CR_1R_2R_3)$; m is 2, 3, 4 or 5; n is 2, 3, 4 or 5; and o is 0 or 1. $R_4$ in each repeat unit is independently selected from hydrogen, $C_{1-4}$alkyl and $C_{1-4}$-hydroxyalkyl. $R_5$ in each repeat unit is independently selected from hydrogen, $C_{1-4}$-alkyl and $C_{1-4}$-hydroxyalkyl. Preferably, $R_1$, $R_2$ and $R_3$ are each methyl. $R_4$ is preferably hydrogen or methyl, especially hydrogen. $R_5$ is preferably hydrogen or methyl, especially hydrogen. Preferably, m is 2, 3 or 4, especially 2 or 3, most preferably 2. Preferably, n is 2, 3 or 4, especially 2 or 3, most preferably 2. Preferably, o is 1.

Suitable amines of the formula (I) are 2-(2-tert-butylaminoethoxy)ethanol (TBAEE), 3-(tert-butylamino)propanol, 4-(tert-butylamino)butanol, 2-(2-tert-amylaminoethoxy)ethanol, 2-(2-(1-methyl-1-ethylpropylamino)ethoxy)ethanol, 2-(tert-butylamino)ethanol, (2-(tert-butylamino)ethyl)methylamine and mixtures thereof. In a preferred embodiment, the amine a) is 2-(2-tert-butylaminoethoxy)ethanol (also referred to as tert-butylaminodiglycol (TBADG)).

The inventive absorbent comprises, as component b), an activator selected from b1) a sterically unhindered primary amine and/or a sterically unhindered secondary amine; and b2) a carboanhydrase.

The sterically unhindered primary or secondary amine b1) comprises, within its molecule, at least one sterically unhindered primary or secondary amino group, i.e. an amine nitrogen atom, to which only hydrogen atoms and primary carbon atoms are bonded.

The sterically unhindered primary or secondary amine b1) preferably does not have any acidic groups such as, in particular, phosphonic acid, sulfonic acid and/or carboxylic acid groups.

The sterically unhindered primary or secondary amine b1) is, for example, selected from alkanolamines such as monoethanolamine (MEA), diethanolamine (DEA), ethylaminoethanol, 1-amino-2-methylpropan-2-ol, 2-amino-1-butanol, 2-(2-aminoethoxy)ethanol and 2-(2-aminoethoxy)ethanamine, polyamines such as hexamethylenediamine, 1,4-diaminobutane, 1,3-diaminopropane, 3-(methylamino)propylamine (MAPA), N-(2-hydroxyethyl)ethylenediamine, 3-(dimethylamino)propylamine (DMAPA), 3-(diethylamino)propylamine, N,N'-bis(2-hydroxyethyl)ethylenediamine, 5-, 6- or 7-membered saturated heterocycles having at least one NH group in the ring, which may comprise one or two further heteroatoms selected from nitrogen and oxygen in the ring, such as piperazine, 2-methylpiperazine, N-methylpiperazine, N-ethyl piperazine, N-(2-hydroxyethyl)piperazine, N-(2-aminoethyl)piperazine, homopiperazine, piperidine and morpholine.

Particular preference is given to 5-, 6- or 7-membered saturated heterocycles having at least one NH group in the ring, which may comprise one or two further heteroatoms selected from nitrogen and oxygen in the ring. Very particular preference is given to piperazine.

Carboanhydrases b2) are zinc metalloenzymes which occur in various isoforms in animals, plants, bacteria and green algae. Carboanhydrases catalyze the reaction of carbon dioxide and water to give carbonic acid and vice versa. The hydrolysis of the carbamate structure formed by primary and secondary amines to amine and hydrogencarbonate can also be accelerated by carboanhydrases, as a result of which the amine is more quickly available again for the $CO_2$ absorption. This is the case especially with sterically hindered primary and secondary amines in which the stability of the carbamate structure is comparatively low and the hydrolysis is correspondingly favored from the outset.

The molar ratio of b) to a) is preferably in the range from 0.05 to 1.0, more preferably in the range from 0.05 to 0.7.

In general, the total concentration of (a) and (b) in the aqueous solution is 10% to 60% by weight, preferably 20% to 50% by weight, more preferably 30% to 50% by weight.

In one embodiment, the aqueous solution comprises at least one organic solvent. The organic solvent is preferably selected from sulfolane, glycols such as ethylene glycol, diethylene glycol, ethylene glycol dimethyl ether, triethylene glycol, triethylene glycol dimethyl ether, di- or mono ($C_{1-4}$-alkyl ether) monoethylene glycols and di- or mono ($C_{1-4}$-alkyl ether) polyethylene glycols, N-methylpyrrolidone, N-methyl-3-morpholine, N-formylmorpholine, N-acetylmorpholine, N,N-dimethylformamide, N,N-dimethylimidazolidin-2-one, N-methylimidazole and mixtures thereof.

In particular embodiments, the absorbent comprises at least one acid. The acid is suitably selected from protic acids (Brønsted acids). The acid is selected from organic and inorganic acids. Suitable organic acids comprise, for example, phosphonic acids, sulfonic acids, carboxylic acids and amino acids. In particular embodiments, the acid is a polybasic acid.

Among the inorganic acids, preference is given to phosphoric acid and sulfuric acid.

Among the carboxylic acids, preference is given to formic acid, acetic acid, benzoic acid, succinic acid and adipic acid.

Among the sulfonic acids, preference is given to methanesulfonic acid, p-toluenesulfonic acid and 2-(4-(2-hydroxyethyl)-1-piperazinyl)ethanesulfonic acid (HEPES).

Among the phosphonic acids, preference is given to 2-hydroxyphosphonoacetic acid, 2-phosphonobutane-1,2,4- tricarboxylic acid, 1-hydroxyethane-1,1-diphosphonic acid, ethylenediaminetetra(methylenephosphonic acid), diethylenetriaminepenta(methylenephosphonic acid), bis(hexamethylene)triaminepenta(methylenephosphonic acid) (HDTMP) and nitrilotris(methylenephosphonic acid), among which 1-hydroxyethane-1,1-diphosphonic acid is particularly preferred.

In other embodiments, the absorbent is free of aminocarboxylic acids, aminosulfonic acids and phosphonic acids.

The absorbent may also comprise additives such as corrosion inhibitors, etc. In general, the amount of such additives is in the range from about 0.01% to 3% by weight of the absorbent.

The process or absorbent according to the invention is suitable for treatment of all kinds of fluids. Fluids are firstly gases such as natural gas, synthesis gas, coke oven gas, cracking gas, coal gasification gas, cycle gas, landfill gases and combustion gases, and secondly fluids that are essentially immiscible with the absorbent, such as liquefied petroleum gas (LPG) or liquefied natural gas (NGL, natural gas liquids). In one embodiment, the fluid stream is a flue gas stream, for example from incineration plants, production gases, synthesis gases or else ambient air. These gases arise, inter alia, in power plants, motor vehicles, production plants, ammonia production, epoxide production, cement production, the ceramics industry, coking plants, metal smelting, the steel industry, blowing agent exposure and climate-controlled working and living areas. Further $CO_2$-containing fluid streams are fermentation gases from the methanogenesis of biomasses, composting gases from the aerobic and/or anaerobic composting of biomasses, combustion gases, animal digestion gases in large-scale animal keeping and $CO_2$-containing ambient air in air conditioning in buildings and vehicles.

The fluid stream comprises carbon dioxide; in addition, it may comprise further acidic gases such as $H_2S$ in particular, but also COS and mercaptans. In addition, it is also possible to remove $SO_3$, $SO_2$, $CS_2$ and HCN.

The inventive process or absorbent is particularly suitable for treatment of hydrocarbonaceous fluid streams. The hydrocarbons present are, for example, aliphatic hydrocarbons such as $C_1$-$C_4$ hydrocarbons such as methane, unsaturated hydrocarbons such as ethylene or propylene, or aromatic hydrocarbons such as benzene, toluene or xylene. More particularly, the process according to the invention is suitable for treatment of a natural gas stream. The absorbent or process according to the invention is particularly suitable for removal of $CO_2$.

Amines of the formula (I) in inventive absorbents have a high oxidation resistance to oxygenous fluid streams. The inventive process or absorbent is therefore particularly suitable for treatment of oxygenous fluid streams. More particularly, the process according to the invention is suitable for treatment of combustion offgases.

In preferred embodiments, there is a partial carbon dioxide pressure in the fluid stream in the range from 0.01 to less than 3.0 bar, especially 0.03 to less than 3.0 bar. The partial pressures stated are based on the fluid stream on first contact with the absorbent in the absorption step.

In the process according to the invention, the fluid stream is contacted with the absorbent in an absorption step in an absorber, as a result of which carbon dioxide is at least partly scrubbed out. This gives a $CO_2$-depleted fluid stream and a $CO_2$-laden absorbent.

The absorber used is preferably a scrubbing apparatus used in customary gas scrubbing processes. Suitable scrubbing apparatuses are, for example, columns having random packings, having structured packings and having trays, membrane contactors, radial flow scrubbers, jet scrubbers, Venturi scrubbers and rotary spray scrubbers, preferably columns having structured packing, having random packings and having trays, more preferably columns having trays and having random packings. The fluid stream is preferably treated with the absorbent in a column in countercurrent. The fluid is generally fed into the lower region and the absorbent into the upper region of the column. Installed in tray columns are sieve trays, bubble-cap trays or valve trays, over which the liquid flows. Columns having random packings can be filled with different shaped bodies. Heat and mass transfer are improved by the increase in the surface area caused by the shaped bodies, which are usually about 25 to 80 mm in size. Known examples are the Raschig ring (a hollow cylinder), Pall ring, Hiflow ring, Intalox saddle and the like. The random packings can be introduced into the column in an ordered manner, or else randomly (as a bed). Possible materials include glass, ceramic, metal and plastics. Structured packings are a further development of ordered random packings. They have a regular structure. As a result, it is possible in the case of structured packings to reduce pressure drops in the gas flow. There are various designs of structured packings, for example woven packings or sheet metal packings. Materials used may be metal, plastic, glass and ceramic.

The temperature of the absorbent in the absorption step is generally about 30 to 100° C., and when a column is used is, for example, 30 to 70° C. at the top of the column and 50 to 100° C. at the bottom of the column. The total pressure in the absorption step is generally about 1 to 180 bar, preferably about 1 to 100 bar.

The process according to the invention may comprise one or more, for example two, successive absorption steps. The absorption can be conducted in a plurality of successive component steps, in which case the crude gas comprising the acidic gas constituents is contacted with a substream of the absorbent in each of the component steps. The absorbent with which the crude gas is contacted may already be partly laden with acidic gases, meaning that it may, for example, be an absorbent which has been recycled from a downstream absorption step into the first absorption step, or be partly regenerated absorbent. With regard to the performance of the two-stage absorption, reference is made to publications EP 0 159 495, EP 0 190 434, EP 0 359 991 and WO 00100271.

The acidic gas constituents can be released from the absorbent loaded with the acid gas components in one regeneration step, a regenerated absorbent being obtained. In the regeneration step, the loading of the absorbent is reduced and the resultant regenerated absorbent is preferably then recycled to the absorption step. In general, the regeneration step comprises at least one of the measures of heating, decompressing and stripping with an inert fluid. Preferably, the partial carbon dioxide pressure in the treated gas is less than 0.05 bar.

The regeneration step preferably comprises heating of the absorbent laden with the acidic gas constituents. The absorbed acid gases are stripped out by means of the steam obtained by heating the solution. Rather than steam, it is also possible to use an inert fluid such as nitrogen. The absolute pressure in the desorber is normally 0.1 to 3.5 bar, preferably 1.0 to 2.5 bar. The temperature is normally 50° C. to 170° C., preferably 80° C. to 130° C., the temperature of course being dependent on the pressure.

The regeneration step may alternatively or additionally comprise a decompression. This includes at least one decompression of the laden absorbent from a high pressure as exists in the conduction of the absorption step to a lower pressure. The decompression can be accomplished, for example, by means of a throttle valve and/or a decompression turbine. Regeneration with a decompression stage is described, for example, in publications U.S. Pat. Nos. 4,537,753 and 4,553,984.

The acidic gas constituents can be released in the regeneration step, for example, in a decompression column, for example a flash vessel installed vertically or horizontally, or a countercurrent column with internals.

The regeneration column may likewise be a column having random packings, having structured packings or having trays. The regeneration column has a heater at the bottom, for example a boiler, natural circulation evaporator, forced circulation evaporator or forced circulation flash evaporator. At the top, the regeneration column has an outlet for the acid gases released. Entrained absorbent vapors are condensed in a condenser and recirculated to the column.

It is possible to connect a plurality of decompression columns in series, in which regeneration is effected at different pressures. For example, regeneration can be effected in a preliminary decompression column at a high pressure typically about 1.5 bar above the partial pressure of the acidic gas constituents in the absorption step, and in a main decompression column at a low pressure, for example 1 to 2 bar absolute. Regeneration with two or more decompression stages is described in publications U.S. Pat. Nos. 4,537,753, 4,553,984, EP 0 159 495, EP 0 202 600, EP 0 190 434 and EP 0 121 109.

Because of the optimal matching of the content of the amine components, the inventive absorbent has a high loading capacity with acidic gases, which can also be desorbed again easily. In this way, it is possible to significantly reduce energy consumption and solvent circulation in the process according to the invention.

The invention is illustrated in detail by the appended drawings and the examples which follow.

Figure 1:
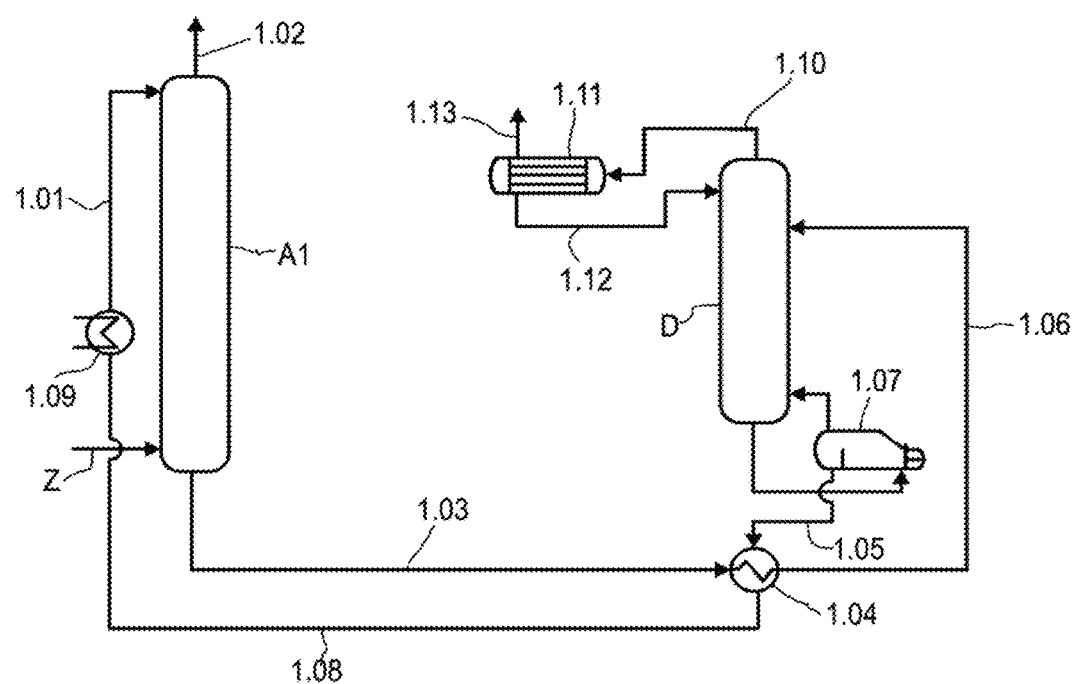
FIG. 1 is a schematic diagram of a plant suitable for performing the process according to the invention.

According to FIG. 1, via the inlet Z, a suitably pretreated gas comprising hydrogen sulfide and carbon dioxide is contacted in countercurrent, in an absorber A1, with regenerated absorbent which is fed in via the absorbent line 1.01. The absorbent removes hydrogen sulfide and carbon dioxide from the gas by absorption; this affords a hydrogen sulfide- and carbon dioxide-depleted clean gas via the offgas line 1.02.

Via the absorbent line 1.03, the heat exchanger 1.04 in which the $CO_2$— and $H_2S$-laden absorbent is heated up with the heat from the regenerated absorbent conducted through the absorbent line 1.05, and the absorbent line 1.06, the $CO_2$— and $H_2S$-laden absorbent is fed to the desorption column D and regenerated. From the lower part of the desorption column D, the absorbent is conducted into the boiler 1.07, where it is heated. The mainly water-containing vapor is recycled into the desorption column D, while the regenerated absorbent is fed back to the absorber A1 via the absorbent line 1.05, the heat exchanger 1.04 in which the regenerated absorbent heats up the $CO_2$— and $H_2S$-laden absorbent and at the same time cools down itself, the absorbent line 1.08, the cooler 1.09 and the absorbent line 1.01. Instead of the boiler shown, it is also possible to use other heat exchanger types to raise the stripping vapor, such as a natural circulation evaporator, forced circulation evaporator or forced circulation flash evaporator. In the case of these evaporator types, a mixed-phase stream of the regenerated absorbent and stripping vapor is returned to the bottom of the desorption column, where the phase separation between the vapor and the absorbent takes place. The regenerated absorbent to the heat exchanger 1.04 is either drawn off from the circulation stream from the bottom of the desorption column to the evaporator or conducted via a separate line directly from the bottom of the desorption column to the heat exchanger 1.04.

The $CO_2$- and $H_2S$-containing gas released in the desorption column D leaves the desorption column D via the offgas line 1.10. It is conducted into a condenser with integrated phase separation 1.11, where it is separated from entrained absorbent vapor. Subsequently, a liquid consisting mainly of water is conducted through the absorbent line 1.12 into the upper region of the desorption column D, and a $CO_2$- and $H_2S$-containing gas is discharged via the gas line 1.13.

Figure 2:
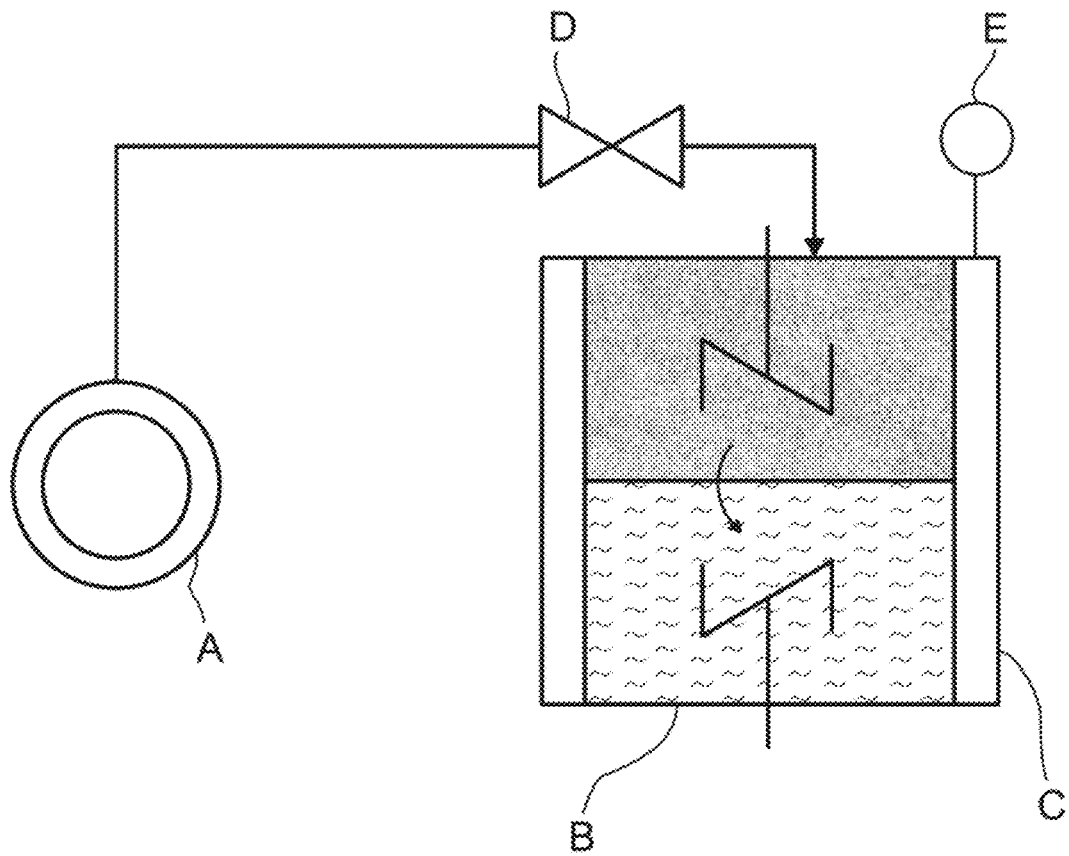
FIG. 2 is a schematic diagram of a twin stirred cell arrangement used to determine the relative $CO_2$ absorption rates of absorbents.

In FIG. 2, the following reference symbols are used: A=$CO_2$ storage vessel, B=twin stirred cell, C=temperature regulator, D=metering valve, E=manometer. According to FIG. 2, a liquid phase of the absorbent to be tested is present in the lower part of the twin stirred cell B, and is in contact with the gas phase above it via a phase boundary. The liquid and gas phase can each be mixed with a stirrer. The twin stirred cell B is connected to the $CO_2$ storage vessel A via a metering valve D. The pressure that exists in the twin stirred cell B can be determined by means of the manometer E. In the measurement, the volume flow rate of carbon dioxide is recorded, the volume flow rate being adjusted such that a constant pressure exists in twin stirred cell B.

EXAMPLE 1

In a twin stirred cell (TSC) according to FIG. 2, the relative $CO_2$ absorption rates of aqueous absorbents were measured.

The twin stirred cell had an internal diameter of 85 mm and a volume of 509 mL. The temperature of the cell was kept at 50° C. during the measurements. In order to mix the gas and liquid phases, the cell according to FIG. 2 comprised two stirrers. Before commencement of the measurement, the twin stirred cell was evacuated. A defined volume of degassed absorbent was added to the twin stirred cell and the temperature was regulated at 50° C. The stirrers were already switched on during the heating of the unladen absorbent. The stirrer speed was selected such that a planar phase boundary formed between the liquid phase and gas phase. Development of waves at the phase interface has to be avoided since there would otherwise be no defined phase interface. After the desired experimental temperature had been attained, carbon dioxide was introduced into the reactor by means of a metering valve. The volume flow rate was controlled such that the pressure was constant at 50 mbar abs over the entire experiment. With increasing experimental duration, the volume flow rate decreased since the absorbent became saturated over time and the absorption rate decreased. The volume flow rate was recorded over the entire period. The experiment was ended as soon as no further carbon dioxide flowed into the twin stirred cell. The absorbent was in an equilibrium state at the end of the experiment. The reported absorption rate was determined at a loading of 10 m³ (STP) of ($CO_2$)/t (absorbent).

The following absorbents were examined: (1-1) aqueous solution of methyldiethanolamine (MDEA) (2.2 M) and piperazine (1.5 M); (1-2) aqueous solution of 2-(2-tert-butylaminoethoxy)ethanol (TBAEE) (2.2 M) and piperazine (1.5 M); and (1-3) aqueous solution of 2-(2-tert-butylaminoethoxy)ethanol (TBAEE) (2.2 M) and monoethanolamine (MEA) (1.5 M). The results are reported in the following table:

| Example | System | Relative absorption rate** |
|---------|--------|----------------------------|
| 1-1* | MDEA + piperazine | 100% |
| 1-2 | TBAEE + piperazine | 311% |
| 1-3 | TBAEE + MEA | 120% |

*comparative example
**based on example 1-1*

It can be seen that, in inventive example 1-2, the absorption rate is much higher than in examples 1-1 and 1-3.

EXAMPLE 2

In this example, in a pilot plant according to FIG. 1, the $CO_2$ removal from a gas stream consisting of 91% $N_2$ and 9% $CO_2$ was examined. The gas stream was at a pressure of 1.05 bar at 40° C. The mass flow rate was 42 kg/h. The particular absorbent had a temperature of 40° C. Structured packings were used in the absorber (height 4.2 m, diameter 0.1 m, pressure 60 bar). Structured packings were likewise used in the desorber (height 2.0 m, diameter 0.085 m, pressure 1.8 bar).

The absorbents used were
(2-1) a 30% by weight aqueous solution of monoethanolamine (MEA);
(2-2) an aqueous solution of methyldiethanolamine (MDEA) (2.2 M) and piperazine (1.5 M); and
(2-3) an aqueous solution of 2-(2-tert-butylaminoethoxy)ethanol (TBAEE) (2.2 M) and piperazine (1.5 M).

The absorbent circulation rate and heating energy were varied such that 70% of the carbon dioxide was removed from the flue gas. The absorbent circulation rates specified in the table below correspond to the absorbent circulation rate with the minimum energy consumption. The relative values specified in the table below are based on the 30% MEA reference system.

| Example | System | Relative absorbent circulation rate** | Relative energy** [%] |
|---------|--------|---------------------------------------|------------------------|
| 2-1* | MEA | 100% | 100% |
| 2-2* | MDEA + piperazine | 81% | 95% |
| 2-3 | TBAEE + piperazine | 63% | 76% |

*comparative example
**based on example 2-1*

It can be seen that the required $CO_2$ removal level of 70% is achieved in example 2-3 with a lower absorbent circulation rate and a lower relative energy consumption compared to comparative examples 2-1 and 2-2.

EXAMPLE 3

In this example, the stability of aqueous absorbents to oxygenous fluid streams was examined.
The absorbents used were:
(3-1) aqueous solution of monoethanolamine (MEA, 30% by weight);
(3-2) aqueous solution of methyldiethanolamine (MDEA, 25% by weight) and piperazine (15% by weight); and
(3-3) aqueous solution of 2-(2-tert-butylaminoethoxy)ethanol (TBAEE, 37% by weight) and piperazine (13% by weight).

A glass pressure reactor with a reflux condenser connected above and a stirrer was initially charged with the absorbent (about 120 g). Through a metal frit with a mean pore size 10 µm, a gas mixture of 8% by volume of $O_2$, 28% by volume of $CO_2$ and 64% by volume of $N_2$ was passed continuously into the absorbent. The volume flow rate of gas was 12.5 L (STP)/h. The glass reactor was heated up to 100° C. and the pressure in the reactor was adjusted to 2 bar by means of a pressure-regulating valve. Under these conditions, the experiments were run over 400 to 500 h. The water discharged together with the gas was recycled by means of the reflux condenser connected above the reactor, which was operated at about 5° C. At regular intervals, samples were taken from the liquid phase and analyzed by means of GC for the amine content (TBAEE and/or MDEA and/or MEA). The amine contents are reported as normalized area proportions in the GC analysis.

Figure 3:
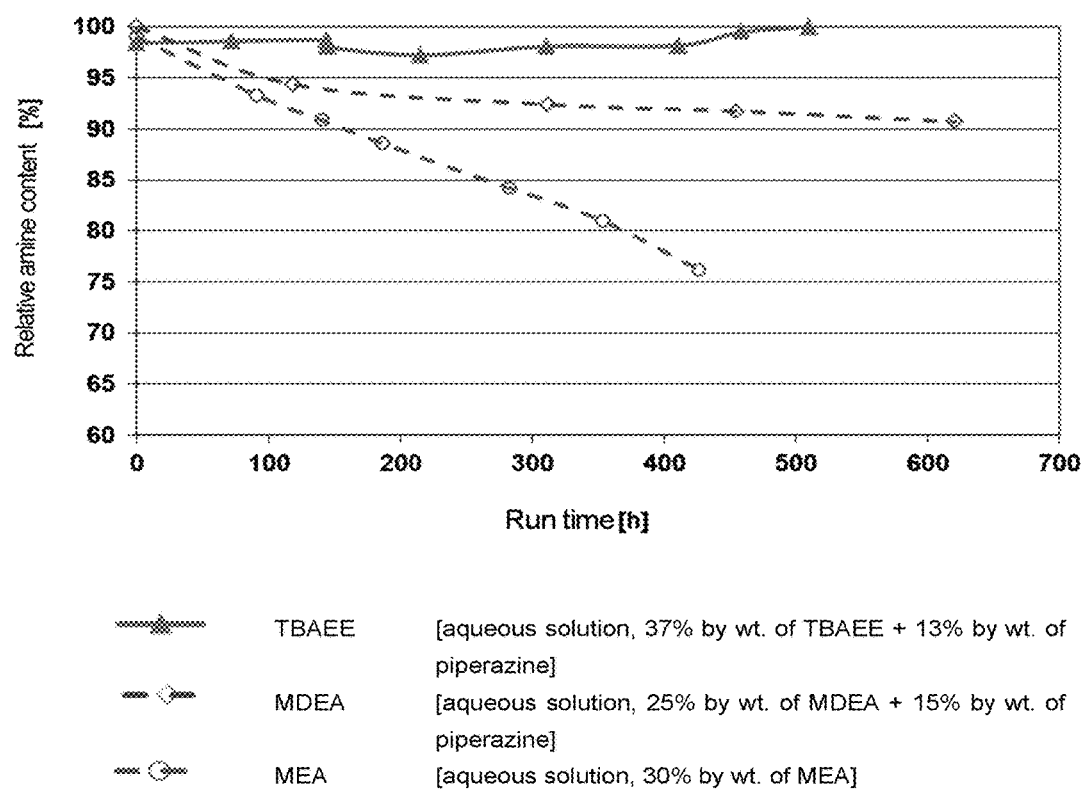
FIG. 3 shows the stability of MEA, MDEA and TBAEE in aqueous absorbents in the presence of oxygen.

FIG. 3 shows the plot of the amine content against time for MEA, MDEA and TBAEE. The normalized area proportion for TBAEE was still nearly 100% after 500 hours of the experiment; thus, no significant breakdown of TBAEE was detectable. In contrast, only about 75% of the amount of MEA used was found after about 400 hours of the experiment; only about 90% of the amount of MDEA used was found.

The invention claimed is:
1. An absorbent for removing carbon dioxide from a fluid stream, the absorbent comprising an aqueous solution comprising:
a) an amine of formula (I):

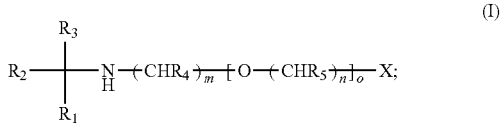

and
b) at least one activator which is a 5-, 6- or 7-membered saturated heterocycle comprising at least one NH group and optionally one or two further heteroatoms, which are nitrogen or oxygen, in the ring,
wherein:
$R_1$, $R_2$ and $R_3$ are each independently $C_{1-4}$-alkyl or $C_{1-4}$-hydroxyalkyl;
each $R_4$ is independently hydrogen, $C_{1-4}$-alkyl or $C_{1-4}$-hydroxyalkyl;
each $R_5$ is independently hydrogen, $C_{1-4}$-alkyl or $C_{1-4}$-hydroxyalkyl;
X is OH or $NH(CR_1R_2R_3)$;
m is 2, 3, 4 or 5;
n is 2, 3, 4 or 5; and
o is 0 or 1.
2. The absorbent according to claim 1, wherein a molar ratio of b) to a) is from 0.05 to 1.0.
3. The absorbent according to claim 1, wherein a total amount of a) and b) in the aqueous solution is 10% to 60% by weight.
4. The absorbent according to claim 1, wherein the amine a) is selected from the group consisting of 2-(2-tert-butylaminoethoxy)ethanol, 3-(tert-butylamino)propanol, 4-(tert-butylamino)butanol, 2-(2-tert-amylaminoethoxy)ethanol, 2-(2-(1-methyl-1-ethylpropylamino)ethoxy)ethanol, 2-(tert-butylamino)ethanol and (2-(tert-butyl amino)ethyl)methylamine.

5. The absorbent according to claim 1, wherein the at least one activator is selected from the group consisting of piperazine, 2-methylpiperazine, N-methylpiperazine, N-ethylpiperazine, N-(2-hydroxyethyl)piperazine, N-(2-aminoethyl) piperazine, homopiperazine, piperidine and morpholine.

6. The absorbent according to claim 1, wherein the aqueous solution further comprises at least one organic solvent.

7. The absorbent according to claim 1, wherein the aqueous solution further comprises at least one acid.

8. The absorbent according to claim 1, which does not contain a phosphonic acid.

9. A process for removing carbon dioxide from a fluid stream, the processing comprising:
contacting the fluid stream with the absorbent according to claim 1, thereby obtaining a treated fluid stream and a carbon dioxide-laden absorbent.

10. The process according to claim 9, wherein a partial carbon dioxide pressure in the fluid stream is from 0.01 to less than 3.0 bar.

11. The process according to claim 9, wherein a partial carbon dioxide pressure in the treated fluid stream is less than 0.05 bar.

12. The process according to claim 9, wherein the fluid stream is a hydrocarbonaceous fluid stream.

13. The process according to claim 9, wherein the fluid stream is an oxygenous fluid stream.

14. The process according to claim 9, wherein the carbon dioxide-laden absorbent is regenerated by at least one measure selected from the group consisting of
   i. heating,
   ii. decompression, and
   iii. stripping with an inert fluid.

* * * * *